US010885426B2

(12) United States Patent
Santoro et al.

(10) Patent No.: US 10,885,426 B2
(45) Date of Patent: Jan. 5, 2021

(54) AUGMENTING NEURAL NETWORKS WITH EXTERNAL MEMORY

(71) Applicant: DeepMind Technologies Limited, London (GB)

(72) Inventors: Adam Anthony Santoro, London (GB); Daniel Pieter Wiestra, London (GB); Timothy Paul Lillicrap, London (GB); Sergey Bartunov, Moscow (RU); Ivo Danihelka, London (GB)

(73) Assignee: DeepMind Technologies Limited, London (GB)

( * ) Notice: Subject to any disclaimer, the term of this patent is extended or adjusted under 35 U.S.C. 154(b) by 1043 days.

(21) Appl. No.: 15/396,289

(22) Filed: Dec. 30, 2016

(65) Prior Publication Data

US 2017/0228637 A1    Aug. 10, 2017

Related U.S. Application Data

(60) Provisional application No. 62/292,158, filed on Feb. 5, 2016.

(51) Int. Cl.
*G06N 3/063* (2006.01)
*G06N 3/04* (2006.01)
(Continued)

(52) U.S. Cl.
CPC ............. *G06N 3/063* (2013.01); *G06N 3/04* (2013.01); *G06N 3/0445* (2013.01); *G06N 3/08* (2013.01); *G06F 12/123* (2013.01)

(58) Field of Classification Search
CPC ........ G06N 3/063; G06N 3/04; G06N 3/0445; G06N 3/08; G06F 12/123
See application file for complete search history.

(56) References Cited

U.S. PATENT DOCUMENTS

2012/0041914 A1    2/2012  Tirunagari
2012/0117329 A1    5/2012  Anderson et al.
2017/0103305 A1*   4/2017  Henry ................... G06N 3/063

OTHER PUBLICATIONS

Graves, Alex, Greg Wayne, and Ivo Danihelka. "Neural turing machines." arXiv preprint arXiv:1410.5401 (2014). (Year: 2014).*

(Continued)

*Primary Examiner* — Li B. Zhen
*Assistant Examiner* — Markus A. Vasquez
(74) *Attorney, Agent, or Firm* — Fish & Richardson P.C.

(57) ABSTRACT

Methods, systems, and apparatus, including computer programs encoded on computer storage media, for augmenting neural networks with an external memory. One of the systems includes a controller neural network that includes a Least Recently Used Access (LRUA) subsystem configured to: maintain a respective usage weight for each of a plurality of locations in the external memory, and for each of the plurality of time steps: generate a respective reading weight for each location using a read key, read data from the locations in accordance with the reading weights, generate a respective writing weight for each of the locations from a respective reading weight from a preceding time step and the respective usage weight for the location, write a write vector to the locations in accordance with the writing weights, and update the respective usage weight from the respective reading weight and the respective writing weight.

22 Claims, 4 Drawing Sheets

(51) Int. Cl.
*G06N 3/08* (2006.01)
*G06F 12/123* (2016.01)

(56) References Cited

OTHER PUBLICATIONS

Robinson, John T., and Murthy V. Devarakonda. "Data cache management using frequency-based replacement." Proceedings of the 1990 ACM SIGMETRICS conference on Measurement and modeling of computer systems. 1990. (Year: 1990).*
International Search Report and Written Opinion in International Application No. PCT/US2016/069570, dated Mar. 31, 2017, 17 pages.
Graves et al. "Neural Turing Machines," arXiv preprint arXiv 1410.5401v1, Oct. 20, 2014, 23 pages.
Khalid et al. "The unconventional replacement algorithms," ACM SIGARCH Computer Architecture News, ACM Special Interest Group on Computer Architecture, 2 Penn Plaza, Suite 701, New York, NY, vol. 23(5), Dec. 15, 1995, 7 pages.
Elaarag et al. "Training of NNPCR-2: An improved neural network proxy cache replacement strategy," Performance Evaluation of Computer & Telecommunication Systems, Jul. 13, 2009, 8 pages.
Santoro et al. "One-shot Learning with Memory-Augmented Neural Networks," arXiv preprint arXiv 1605.06065, May 19, 2016, 13 pages.
Written Opinion issued in International Application No. PCT/US2016/069570, dated Jan. 16, 2018, 8 pages.
EP Office Action in European Appln. No. 16828903.1. dated Aug. 1, 2019, 5 pages.
International Preliminary Report on Patentability issued in International Application No. PCT/US2016/069570, dated Apr. 19, 2018, 14 pages.
EP Communication pursuant to Article 94(3) EPC in European Appln. No. 16828903.1, dated Mar. 18, 2020, 4 pages.

* cited by examiner

AUGMENTING NEURAL NETWORKS WITH EXTERNAL MEMORY

CROSS-REFERENCE TO RELATED APPLICATION

This application claims priority to U.S. Provisional Application No. 62/292,158, filed on Feb. 5, 2016. The disclosure of the prior application is considered part of and is incorporated by reference in the disclosure of this application.

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from processing a previous input in computing a current output. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to augmented neural network systems. In general, an augmented neural network system includes a neural network configured to receive a neural network input and generate a neural network output, an external memory that stores values derived from portions of the neural network output, and a memory access subsystem that is configured to receive the neural network output and read and write from/to the external memory based on the neural network output and a number of weighted values corresponding to locations in the external memory.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. By augmenting a neural network with an external memory, the augmented neural network can more accurately generate outputs from received inputs for a variety of machine learning tasks. Such augmented neural networks may store and access new information flexibly by providing a mechanism in which inferences may be drawn from new data based on longer-term experience i.e., inductive transfer. Given their combination of flexible memory storage and the rich capacity of deep architectures for representation learning, augmented neural networks allow for gradual, incremental learnings to encode background knowledge that spans tasks. Moreover, a more flexible memory resource binds information particular to newly encountered tasks. Augmented neural networks may be employed to quickly encode and retrieve new information, and hence can potentially obviate the downsides of conventional models. In particular, an augmented neural network may rapidly assimilate new data and leverage this data to make accurate predictions after only a single or a few samples. Further, the augmented neural network accesses the external memory by focusing on memory content, which supports robust meta learning and extends the range of problems to which deep learning can be effectively applied.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
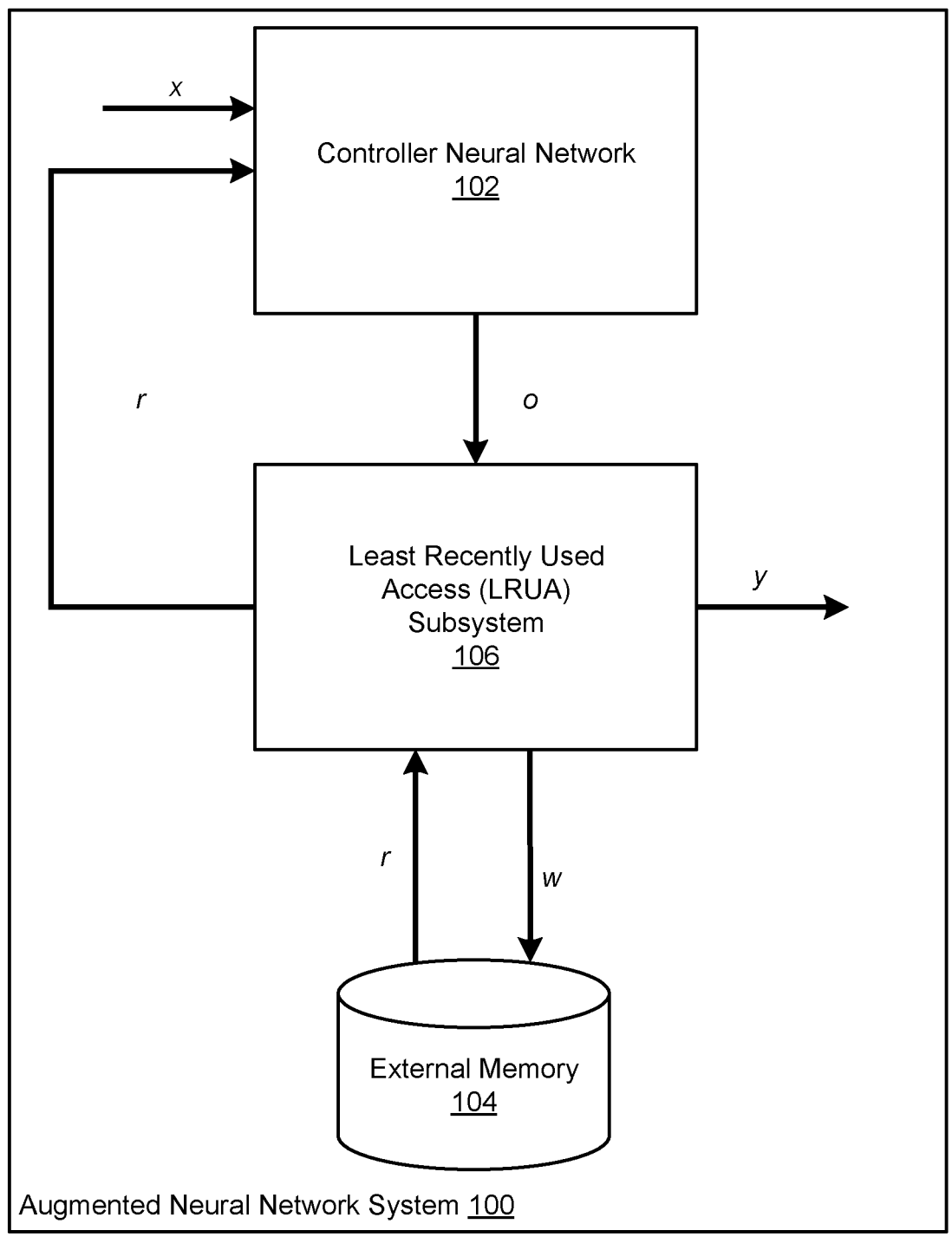
FIG. 1 shows an example augmented neural network system.

FIG. 1 shows an example augmented neural network system 100. The augmented neural network system 100 is an example of a system implemented as computer programs on one or more computers in one or more locations, in which the systems, components, and techniques described below are implemented.

The augmented neural network system 100 is a machine learning system that receives a sequence of system inputs and generates a sequence of system outputs from the system inputs. For example, the augmented neural network system 100 can receive a system input x as part of an input sequence and generate a system output y from the system input x. The augmented neural network system 100 can store the generated sequence of outputs in an output data repository or provide the output for use for some other immediate purpose.

The augmented neural network system 100 can be configured to receive any kind of digital data input and to generate any kind of score or classification output based on the input.

For example, if the inputs to the augmented neural network system 100 are images or features that have been extracted from images, the output generated by the augmented neural network system 100 for a given image may be scores for each of a set of object categories, with each score representing an estimated likelihood that the image contains an image of an object belonging to the category.

As another example, if the inputs to the augmented neural network system 100 are Internet resources (e.g., web pages), documents, or portions of documents or features extracted from Internet resources, documents, or portions of documents, the output generated by the augmented neural network system 100 for a given Internet resource, document, or portion of a document may be a score for each of a set of topics, with each score representing an estimated likelihood that the Internet resource, document, or document portion is about the topic.

As another example, if the inputs to the augmented neural network system 100 are features of an impression context for a particular advertisement, the output generated by the augmented neural network system 100 may be a score that represents an estimated likelihood that the particular advertisement will be clicked on.

As another example, if the inputs to the augmented neural network system 100 are features of a personalized recommendation for a user, e.g., features characterizing the context for the recommendation or features characterizing previous actions taken by the user, the output generated by the augmented neural network system 100 may be a score for each of a set of content items, with each score representing an estimated likelihood that the user will respond favorably to being recommended the content item.

As another example, if the input to the augmented neural network system 100 is text in one language, the output generated by the augmented neural network system 100 may be a score for each of a set of pieces of text in another language, with each score representing an estimated likelihood that the piece of text in the other language is a proper translation of the input text into the other language.

As another example, if the input to the augmented neural network system 100 is a spoken utterance, a sequence of spoken utterances, or features derived from one of the two, the output generated by the augmented neural network system 100 may be a score for each of a set of pieces of text, each score representing an estimated likelihood that the piece of text is the correct transcript for the utterance or sequence of utterances.

As another example, if the inputs to the augmented neural network system 100 are pieces of code from a computer program, the output generated by the augmented neural network system 100 may identify a predicted output of the computer program.

As another example, the augmented neural network system 100 can be part of a speech synthesis system.

As another example, the augmented neural network system 100 can be part of a video processing system.

As another example, the augmented neural network system 100 can be part of a dialogue system.

As another example, the augmented neural network system 100 can be part of an auto completion system.

As another example, the augmented neural network system 100 can be part of a text processing system.

As another example, the augmented neural network system 100 can be part of a reinforcement learning system.

In particular, the augmented neural network system 100 includes a controller neural network 102 and an external memory 104. The controller neural network 102 may be a feedfoward neural network or a recurrent neural network, e.g., a long short-term memory (LSTM) neural network, that is configured to, at each of multiple time steps, receive a neural network input and process the neural network input to generate a neural network output for the time step.

Generally, the neural network input received by the controller neural network 102 is a combination of the current system input and data read from the external memory 104 by a memory interface subsystem, such as a Least Recently Used Access (LRUA) subsystem 106. For example, the controller neural network 102 may be configured to receive a current neural network input made up of the current system input x and data r read from the external memory 104 and to generate a neural network output o that is provided to the LRUA subsystem 106. Neural network output o may include a read key and a write vector. In some implementations, the write vector is the same as the read key, i.e., the same set of values is used as both the read key and the write vector. In other implementations, the write vector is different from the read key.

To allow the controller neural network 102 to make use of the external memory 104, the system also includes the LRUA subsystem 106. The LRUA subsystem 106 is configured to maintain a respective usage weight for each of multiple locations in the external memory 104 that represents a strength with which the location has recently been written to or read from by the LRUA subsystem 106.

To read from the external memory 104, the LRUA subsystem 106 is configured to, for each of the time steps, generate a respective reading weight for each of the locations in the external memory 104 using the read key and then read data from the locations in the external memory 104 in accordance with the reading weights.

To write to the external memory, the LRUA subsystem 106 is configured to generate a respective writing weight for each of the locations in the external memory 104 from a respective reading weight for the location from a preceding time step and the respective usage weight for the location and write the write vector to the locations in the external memory 104 in accordance with the writing weights.

The LRUA subsystem 106 is also configured to, for each time step, update the respective usage weight for each of the locations in the external memory 104 from the respective reading weight for the location and the respective writing weight for the location.

In some examples, the LRUA subsystem 106 receives outputs generated by the controller neural network 102, e.g., neural network output o, and translates the received outputs into read and write operations to be performed on the external memory 104. That is, the LRUA subsystem 106 receives an output o from the controller neural network 102 and, based on the read key, the read weight, the usage weight, and the write weight, writes data w, which may include the received write vector, to the external memory 104, and reads data r from the external memory 104. In some examples, LRUA subsystem 106 may read and write data from/to external memory 104 via respective read and write heads. The LRUA subsystem 106 generates the system output y based on the read data. The data read by the LRUA subsystem 106 can then be provided to the controller neural network 102 as a portion of a later neural network input, e.g., along with the next system input.

The LRUA module 106 may be a pure content-based memory writer that writes memories to either the least used memory location or the most recently used memory location within the external memory 104. This module emphasizes accurate encoding of relevant (i.e., recent) information, and pure content-based retrieval. In some examples, new information may be written into rarely-used locations, preserving recently encoded information. In some examples, new information may be written to the last used location, which can function as an update of the memory with newer, possibly more relevant information. The distinction between these two options can be accomplished with an interpolation between the previous read weights and weights scaled according to usage weights. In some examples, the usage weights are updated at each time-step by decaying the previous usage weights and adding the current read and write weights.

The external memory 104 stores data vectors written to the external memory 104 by the LRUA subsystem 106. In some implementations, the external memory 104 is a real-valued matrix memory that has elements M(i,j,t), where i indexes location, j indexes the vector element, and t indexes time. Thus, M(i,j,t) would be the value stored at element j of the vector stored at location i in the external memory 104 at time t. By configuring the external memory 104, the LRUA subsystem 106, and the controller neural network 102 in this manner, the components of the augmented neural network system 100 are entirely differentiable, allowing the augmented neural network system 100 to be effectively trained.

Figure 2:
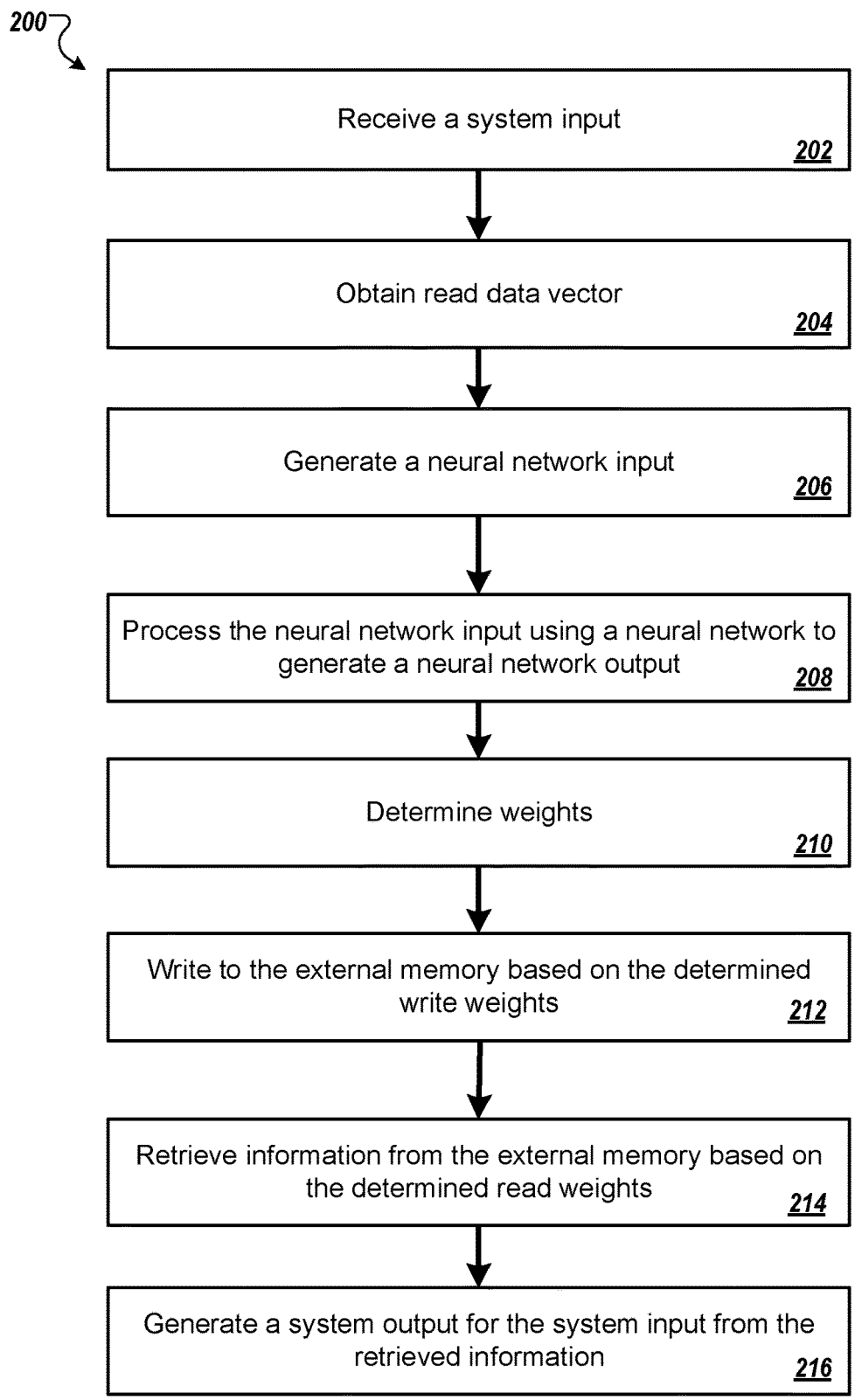
FIG. 2 is a flow diagram of an example process for generating a system output from a system input.

FIG. 2 is a flow diagram of an example process 200 for generating a system output from a system input at a given time step. For convenience, the process 200 will be described as being performed by a system of one or more computers located in one or more locations. For example, an augmented neural network system, e.g., the augmented neural network system 100 of FIG. 1, appropriately programmed in accordance with this specification, can perform the process 200.

The system receives a system input for the time step (step 202). The system input is one of a sequence of system inputs received by the system.

The system obtains read data from an external memory (step 204), e.g., the external memory 104 of FIG. 1. Generally, the read data was generated by the system by reading from the external memory during processing of the preceding input in the sequence of system inputs i.e., at the preceding time step(s).

The system generates a neural network input by combining the system input and the data read from the external memory (step 206). For example, the system can concatenate the system input and the read data to generate the neural network input. For the first system input, the system can concatenate the system input with a pre-determined vector, e.g., a learned state of the neural network.

The system processes the neural network input using a neural network, e.g., the controller neural network 102 of FIG. 1, to generate a neural network output from the neural network input (step 208). Depending on the implementation, the neural network can either be a feed-forward neural network, e.g., a convolutional neural network or another kind of deep feed-forward neural network, or a recurrent neural network, e.g., an LSTM neural network. If the neural network is a recurrent neural network, the recurrent neural network also uses the internal state of the recurrent neural network from the preceding neural network input in the sequence in processing the current neural network input to generate the neural network output. In some implementations, the neural network includes both recurrent and feed-forward layers.

The system determines the read weights, write weights, and usage weights for the current time step from the read key in the neural network output and the weights from the previous time step(s) (step 210). Determining these weights is described in more detail below with reference to FIG. 3.

The system determines a write vector to be written to the external memory from the received neural network output and then writes the write vector to the external memory in accordance with the write weights (step 212). In some examples, the system may write the write vector to multiple memory locations within the external memory.

In some examples, prior to writing to the external memory, the least used memory location is computed from the usage weights from the previous time step ($w_{t-1}^u$) and is set to zero. For example, the system may identify a location in the memory that has a lowest usage weight and erase the data stored in the identified location, i.e., set the data stored at the location to a vector of zeroes.

Writing to external memory then occurs in accordance with the computed write weights:

$$M_t(i) \leftarrow M_{t-1}(i) + w_t^w(i)k_t, \forall i.$$

where $M_{t-1}(i)$ is the data stored at a particular location i in the external memory prior to the write, i.e., after the preceding time step, $w_t^w$ is the current write weight for location i in the external memory, and $k_t$ is the read key. In implementations where the write vector is different from the read key, the read key is replaced with the write vector.

The system reads from the external memory using the determined read wrights and the read key (step 214). Determining the read weights is described in more detail below with reference to FIG. 3. In some examples, information within a memory location, $r_t$, is retrieved using the determined read weights according to:

$$r_t \leftarrow \Sigma_i w_t^r(i) M_t(i),$$

where $w_t^r(i)$ is the read weight for the location i, and $M_t(i)$ is the data stored in location i in the external memory.

In some implementations, the system performs multiple read and write operations for a given system input. For example, the system can perform multiple read operations, multiple write operations, or both in parallel and independently of each of the other operations. Additionally, the system can use different memory access weights in performing each set of operations.

The system generates a system output for the system input from the information retrieved according to the read weights (step 216). The system may include one or more output layers configured to process the retrieved information for each time step to generate a system output for each time step. For example, the retrieved information may be directly provided as the system output or processed through a softmax layer or another output layer to generate the system output. The system also provides the retrieved information as part of the next neural network input.

In alternative implementations, the neural network output may also include a system output portion, i.e., in addition to the read key and the write vector, that the system uses as the system output, i.e., instead of generating the system output from the retrieved information.

In implementations where the system performs multiple read operations for a given system input, e.g., in parallel as described above, each read operation can be performed independently with optionally different values for the read weights. In these implementations, the system can combine the read data vectors generated by each read operation, e.g., by concatenating the vectors, to form a final read data vector that is provided as part of the next neural network input to the neural network.

In implementations where the system performs multiple write operations for a given system input, e.g., in parallel as described above, each write operation can be performed independently with optionally different values for the writing weights and the write vectors. Thus, the cumulative effect of the multiple write operations being performed in parallel is additive.

Additionally, the system can perform the read, and write operations in any order. For example, in some implementations, the system writes and then reads from the external memory. However, in other implementations, the system can perform these operations in a different order.

The process 200 can be performed for each system input in a sequence of system inputs to generate a sequence of system outputs for the sequence of system inputs. The sequence of system inputs can be a sequence for which the desired output, i.e., the output sequence that should be generated by the system for the input sequence, is not known. The system can also perform the process 200 on inputs in a set of training data, i.e., a set of inputs for which the output that should be predicted by the system is known, in order to train the system, i.e., to determine trained values for the parameters of the neural network and any additional parameters of processes used in erasing, writing, and reading from the external memory. Because the components of the system are entirely differentiable, the process 200 can be performed repeatedly on inputs selected from a set of training data as part of a conventional machine learning training technique to train the neural network, e.g., a stochastic gradient descent backpropagation through time training technique if the neural network is a recurrent neural network.

Figure 3:
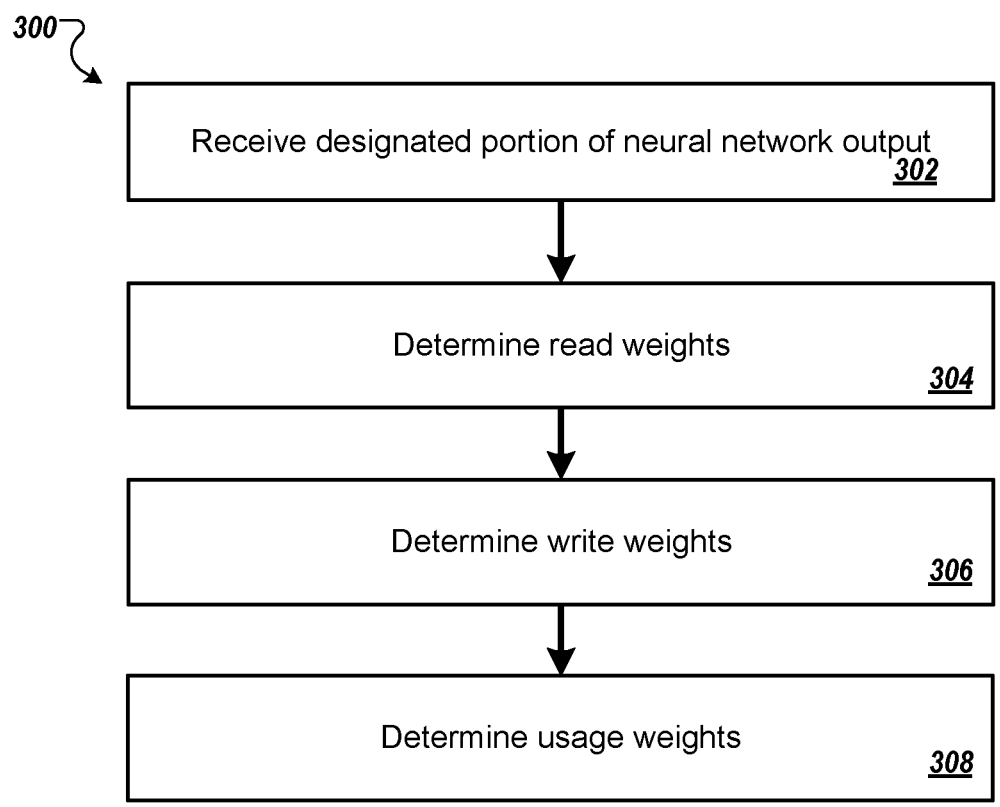
FIG. 3 is a flow diagram of an example process for determining weights for a time step.

FIG. 3 is a flow diagram of an example process for determining weights from a neural network output. For convenience, the process 300 will be described as being performed by a system of one or more computers located in one or more locations. For example, an augmented neural network system, e.g., the augmented neural network system 100 of FIG. 1, appropriately programmed in accordance with this specification, can perform the process 300.

The system receives a neural network output from a neural network, e.g., the controller neural network 102 of FIG. 1, (step 302). The neural network output may include a read key and write vector.

The system determines the read weights, $w_t^r$ from the received read key (step 304). When reading from the external memory, the external memory $M_t$ is addressed using the cosine similarity measure, $$K(k_t, M_t(i)) = \frac{k_t \cdot M_t(i)}{\|k_t\| \|M_t(i)\|},$$

which is used to produce a read-weight vector, $w_t^r$, with elements computed according to a softmax:

$$w_t^r(i) \leftarrow \frac{\exp K(k_t, M_t(i))}{\sum_j \exp K(k_t, M_t(j))}.$$

The system determines the write weights for the current time step from the read and usage weights from the previous time step(s) using the LRUA Subsystem (step 306). To obtain the write weights, $w_t^r$, a learnable sigmoid gate parameter may be used to compute a convex combination of the previous read weights and previous usage weights:

$$w_t^w \leftarrow \sigma(\alpha) w_{t-1}^r + (1 - \sigma(\alpha)) w_{t-1}^{lu},$$

where $\sigma(\cdot)$ is the sigmoid function, $$\frac{1}{1+e^{-x}}, w_{t-1}^r$$

is the read weight for the previous time step (t-1), $w_{t-1}^{lu}$ is the least used weight for the previous time step, and $\alpha$ is the learnable gate parameter to interpolate between the weights.

The system determines the usage weights for the current time step from the read and write weights from the current time step along with the usage weights from the previous time step(s) using the LRUA Subsystem (step 308). These usage weights, $w_t^u$, are updated at each time-step t by decaying the previous usage weights $w_{t-1}^u$, and adding the current read $w_t^r$, and write weights $w_t^w$:

$$w_t^u \leftarrow \gamma w_{t-1}^u + w_t^r + w_t^w,$$

where $\gamma$ is a decay parameter.

Optionally, the system may determine the least-used weights, $w_t^{lu}$ for the current time step from the usage weights for the time step using the LRUA Subsystem. Elements of $w_t^{lu}$ are set accordingly:

$$w_t^{lu}(i) = \begin{cases} 0 & \text{if } w_t^u(i) > m(w_t^u) \\ 1 & \text{if } w_t^u(i) \leq m(w_t^u) \end{cases},$$

where m(v) denotes the smallest element of the vector v. The least-used weights determined for the time step t may be used to determine the write weights for the next time step, t+1 (see above for determining $w_t^w$). Alternatively, they system may directly use the determined usage weights for the time step t in place of the least-used weights to determine the write weights.

Depending on the implementation, the system can maintain various degrees of persistence of the data stored in the external memory based on outputs received from the neural network. For example, in some implementations, the system re-sets the external memory after each sequence of system inputs has been fully processed by the system. As another example, in some implementations, the data stored in the external memory persists between input sequences. That is, the system does not delete any data from the external memory between sequences of system inputs. In these implementations, the system may re-set the external memory after a given task assigned to the system is completed and before the system begins a different machine learning task. Alternatively, the system may maintain the external memory without deleting values even between tasks. Thus, while processing a current input sequence, the system may be able to leverage data stored in the memory while processing a previous input sequence or even while performing a previous machine learning task.

Figure 4:
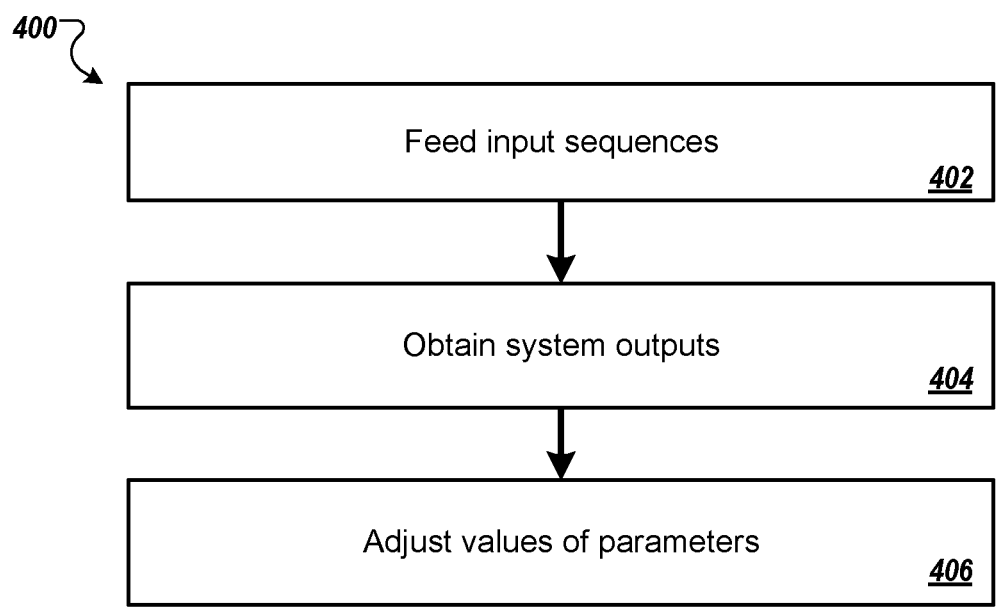
FIG. 4 is a flow diagram of an example of an augmented neural network system employing meta-learning tasks.

FIG. 4 is a flow diagram of an example process 400 of an augmented neural network system performing meta-learning tasks. For convenience, the process 400 will be described as being performed by a system of one or more computers located in one or more locations. For example, an augmented neural network system, e.g., the augmented neural network system 100 of FIG. 1, appropriately programmed in accordance with this specification, can perform the process 400.

As described in FIG. 4, the disclosed augmented neural network is capable of meta-learning in tasks that carry significant short- and long-term memory demands. Meta-learning generally refers to a scenario in which an agent learns at two levels, each associated with different time scales. Rapid learning occurs within a task, for example, when learning to accurately classify within a particular dataset. This learning may be guided by knowledge accrued more gradually across tasks, which captures the way in which task structure varies across target domains.

Such meta-learning may manifest as an ability to successfully carry out industrial meta-learning tasks with high accuracy after only a few presentations, and to perform principled function estimation based on a small number of samples. Examples of industrial meta-learning tasks include spam classification (e.g., classification based recommendation and classification based ranking of search results), quick learning to recognize the speech of a new speaker, rapid classification from very few training examples by any desired useful actionable property (e.g., discerning rotten fruit or faulty items on a conveyor belt), and counting items of a given type from very few examples of that particular type (e.g., the number of chickens in a cage from a realistic cluttered image, the number of trees from an aerial image, or the number of people in an area).

The disclosed augmented neural network system may combine an ability to slowly learn an abstract method for obtaining useful representations of raw data, via gradient descent, and the ability to rapidly bind never-before-seen information after minimal presentations, via an external memory module. Such a combination supports robust meta-learning, extending the range of problems to which deep learning can be effectively applied. Thus, the disclosed augmented neural network system may learn a general strategy for the types of representations to be placed into memory and how to later use these representations for predictions.

To configure the controller neural network 102 of FIG. 1 to carry out a meta-learning scenario, the system trains the neural network to determine trained values of the parameters θ of the neural network to reduce the expected learning cost, L, across a distribution of datasets, p(D), with each data set corresponding to a different task. Training the neural network for an example meta-learning scenario is described below with reference to the process 400.

To train the neural network, the system may feed a series of input sequences for each data set (step 402). To accomplish this goal, a task or episode may involve the presentation of some dataset: $D=\{d_t\}_{t=1}^T=\{(x_t,y_t)\}_{t=1}^T$. For image classification tasks, $y_t$ is the class label for an image $x_t$, and for regression, $y_t$ is the value of a hidden function for a vector with real-valued elements $x_t$, or a real-valued number $x_t$. In this setup, $y_t$ has a purpose in addition to being the target for the output of controller neural network 102. $y_t$ may also be presented as input along with $x_t$, in a temporarily offset manner.

The neural network produces a system output for each system input (step 404). For example, the neural network may be fed the input sequence $(x_1;$ null$); (x_2; y_1); \ldots ; (x_T; y_{T-1})$. At time t, the correct label for the previous data sample $(y_{t-1})$ may be provided as input along with a new query $x_t$. In such examples, the controller neural network 102 may be tasked to output the appropriate label for $x_t$ (i.e., $y_t$) at the given timestep. Additionally, labels may be shuffled from dataset-to-dataset to prevent the controller neural network 102 from slowly learning sample-class bindings in its weights, and instead, learn to hold data samples in memory until the appropriate labels are presented at a next time step, after which, sample-class information can be bound and stored for later use. Thus, for a given episode, performance may involve a random guess for the first presentation of a class, since the appropriate label cannot be inferred from previous episodes due to label shuffling, and the use of memory to achieve increased accuracy thereafter. In some examples, the employed augmented neural network system aims at modelling the predictive distribution $p(y_t|x_t, D_{1:t};\theta)$, inducing a corresponding loss at each time step.

The system adjusts values of the parameters of the neural network based on errors between the produced labels and the actual labels for the inputs in the data sets (step 406), e.g., using a conventional neural network training technique such as backpropagation through time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An augmented neural network system for processing a sequence of system inputs to generate a sequence of system outputs, the augmented neural network system comprising one or more computers storing instructions that when executed by the one or more computers cause the one or more computers to implement:

a controller neural network configured to receive a neural network input at each of a plurality of time steps and to process the neural network input to generate a neural network output for the time step, wherein each neural network output includes:
        a read key, and
        a write vector;
    an external memory that is external to the controller neural network; and
    a Least Recently Used Access (LRUA) subsystem that is configured to:
        maintain a respective usage weight for each of a plurality of locations in the external memory that, for each location, is based on reading weights and writing weights generated for the location by the LRUA subsystem across the plurality of time steps, and
        for each of the plurality of time steps:

generate a respective reading weight for the time step for each of the plurality of locations in the external memory using the read key, read data from the plurality of locations in the external memory in accordance with the reading weights, generate a respective writing weight for the time step for each of the plurality of locations in the external memory from a respective reading weight for the location generated at a preceding time step and a respective usage weight for the location after the preceding time step, write the write vector to the plurality of locations in the external memory in accordance with the writing weights, and update the respective usage weight after the preceding time step for each of the plurality of locations in the external memory from the respective reading weight for the location for the time step and the respective writing weight for the location for the time step to generate an updated usage weight for a next time step, comprising, for each of the plurality of locations:

determining a decayed usage weight for the location from the usage weight for the location after the preceding time step; and determining the updated usage weight for the location for the next time step by summing the decayed usage weight, the reading weight for the location for the time step, and the writing weight for the location for the time step.

2. The system of claim 1, wherein the read key is different from the write vector.

3. The system of claim 1, wherein the read key is the same as the write vector.

4. The system of claim 1, wherein the LRUA subsystem is further configured to, for each of the plurality of time steps:

prior to writing the write vector to the plurality of locations and updating the respective usage weight for each of the plurality of locations:

identify a location in the external memory that has a lowest usage weight; and erase the data stored in the identified location.

5. The system of claim 4, wherein the instructions cause one or more computers to implement one or more output layers, and wherein the one or more output layers are configured to, for each of the plurality of time steps:

process the data read from the external memory for the time step to generate a system output for the time step.

6. The system of claim 1, wherein the neural network output for each of the plurality of time steps further includes a system output portion.

7. The system of claim 6, wherein the LRUA subsystem is further configured to, for each of the plurality of time steps, provide an output derived from the system output portion as a system output for the time step.

8. The system claim 7, wherein the instructions cause one or more computers to implement one or more output layers, and wherein the one or more output layers are configured to, for each of the plurality of time steps:

process the data read from the external memory and the system output portion for the time step to generate a system output for the time step.

9. The system of claim 1, wherein the neural network input for each time step is a respective system input from the sequence of system inputs.

10. The system of claim 1, wherein the LRUA subsystem is further configured to, for each of the plurality of time steps:

combine the data read from the external memory and a respective system input from the sequence of system inputs to generate a subsequent neural network input for a subsequent time step.

11. The system of claim 10, wherein generating a respective writing weight for each of the plurality of locations in the external memory from a respective reading weight for the location and a preceding time step and the respective usage weight for the location comprises: determining a convex combination of the respective reading weight for the location and the preceding time step and the respective usage weight for the location in accordance with an interpolation parameter.

12. The system of claim 1, wherein determining the decayed usage weight for the location from the usage weight for the location after the preceding time step comprises:

applying a decay parameter to the usage weight for the location after the preceding time step.

13. The system of claim 1, wherein the controller neural network has been trained using a meta-learning training technique.

14. The system of claim 1, wherein:

generating a respective writing weight for the time step for each of the plurality of locations in the external memory from a respective reading weight for the location generated at a preceding time step and a respective usage weight for the location after the preceding time step comprises:

determining a respective least-used weight after the preceding time step for each of the plurality of locations from the respective usage weights for the plurality of locations after the preceding time step; and combining, for each of the locations, the respective reading weight for the location generated at the preceding time step and the respective least-used weight for the location after the preceding time step to generate the respective writing weight for the time step for the location.

15. The system of claim 14, wherein determining the respective least-used weight after the preceding time step for each of the plurality of locations from the respective usage weights for the plurality of locations after the preceding time step comprises:

setting the least-used weight for a location that has a smallest usage weight after the preceding time step to one; and setting the least-used weights for all locations other than the location that has the smallest usage weight after the preceding time step to zero.

16. A computer-implemented method for processing a sequence of system inputs to generate a sequence of system outputs, the method comprising:

maintaining a respective usage weight for each of a plurality of locations in an external memory that, for each location, is based on reading weights and writing weights generated for the location across a plurality of time step;

receiving a neural network input at each of the plurality of time steps;

processing the neural network input using a controller neural network to generate a neural network output for the time step, wherein the neural network output includes a read key and a write vector, wherein the external memory is external to the neural network;
generating a respective reading weight for the time step for each of the plurality of locations in the external memory using the read key;
reading data from the plurality of locations in the external memory in accordance with the reading weights;
generating a respective writing weight for the time step for each of the plurality of locations in the external memory from a respective reading weight for the location generated at a preceding time step and a respective usage weight for the location after the preceding time step;
writing the write vector to the plurality of locations in the external memory in accordance with the writing weights; and
updating the respective usage weight after the preceding time step for each of the plurality of locations in the external memory from the respective reading weight for the location for the time step and the respective writing weight for the location for the time step to generate an updated usage weight for a next time step, comprising, for each of the plurality of locations:
determining a decayed usage weight for the location from the usage weight for the location after the preceding time step; and
determining the updated usage weight for the location for the next time step by summing the decayed usage weight, the reading weight for the location for the time step, and the writing weight for the location for the time step.

17. The method of claim 16, further comprising:
prior to writing the write vector to the plurality of locations and updating the respective usage weight for each of the plurality of locations:
identifying a location in the external memory that has a lowest usage weight; and
erasing the data stored in the identified location.

18. The method of claim 16, further comprising:
processing the data read from the external memory through one or more output neural network layers to generate a system output.

19. The method of claim 16, wherein the neural network input is a respective system input from the sequence of system inputs.

20. The method of claim 16, further comprising: combining the data read from the external memory and a system input from the sequence of system inputs to generate a subsequent neural network input for a subsequent time step.

21. The method of claim 16, wherein generating a respective writing weight for each of the plurality of locations in the external memory from a respective reading weight for the location and a preceding time step and the respective usage weight for the location comprises: determining a convex combination of the respective reading weight for the location and the preceding time step and the respective usage weight for the location in accordance with an interpolation parameter.

22. One or more non-transitory computer-readable media storing instructions that, when executed by one or more computers, cause the one or more computers to perform operations for generating a sequence of outputs from a sequence of inputs, the operations comprising:
maintaining a respective usage weight for each of a plurality of locations in an external memory that, for each location, is based on reading weights and writing weights generated for the location across a plurality of time steps;
receiving a neural network input at each of the plurality of time steps;
processing the neural network input using a controller neural network to generate a neural network output for the time step, wherein the neural network output includes a read key and a write vector, wherein the external memory is external to the neural network;
generating a respective reading weight for the time step for each of the plurality of locations in the external memory using the read key;
reading data from the plurality of locations in the external memory in accordance with the reading weights;
generating a respective writing weight for the time step for each of the plurality of locations in the external memory from a respective reading weight for the location generated at a preceding time step and a respective usage weight for the location after the preceding time step;
writing the write vector to the plurality of locations in the external memory in accordance with the writing weights; and
updating the respective usage weight after the preceding time step for each of the plurality of locations in the external memory from the respective reading weight for the location for the time step and the respective writing weight for the location for the time step to generate an updated usage weight for a next time step, comprising, for each of the plurality of locations:
determining a decayed usage weight for the location from the usage weight for the location after the preceding time step; and
determining the updated usage weight for the location for the next time step by summing the decayed usage weight, the reading weight for the location for the time step and the writing weight for the location for the time step.

* * * * *